(12) United States Patent
Tukker et al.

(10) Patent No.: US 7,310,189 B2
(45) Date of Patent: Dec. 18, 2007

(54) VARIABLE BEAM SHAPING ELEMENT

(75) Inventors: Teunis Willem Tukker, Eindhoven (NL); Bernardus Hendrikus Wilhelmus Hendriks, Eindhoven (NL); Stein Kuiper, Eindhoven (NL)

(73) Assignee: Koninklijke Philips Electronics, N.V., Eindhoven (NL)

( * ) Notice: Subject to any disclaimer, the term of this patent is extended or adjusted under 35 U.S.C. 154(b) by 30 days.

(21) Appl. No.: 10/564,535

(22) PCT Filed: Jul. 7, 2004

(86) PCT No.: PCT/IB2004/051158

§ 371 (c)(1),
(2), (4) Date: Jan. 12, 2006

(87) PCT Pub. No.: WO2005/006312

PCT Pub. Date: Jan. 20, 2005

(65) Prior Publication Data

US 2006/0176574 A1 Aug. 10, 2006

(30) Foreign Application Priority Data

Jul. 14, 2003 (EP) .................................. 03102145

(51) Int. Cl.
*G02B 1/06* (2006.01)

(52) U.S. Cl. ...................................... 359/665; 359/666

(58) Field of Classification Search ......... 359/665–667
See application file for complete search history.

(56) References Cited

U.S. PATENT DOCUMENTS

| 4,890,914 A | * | 1/1990 | Templeton ................. 359/667 |
| 6,288,846 B1 | | 9/2001 | Stoner, Jr. |
| 6,418,108 B1 | | 7/2002 | Ueda et al. |
| 2002/0090168 A1 | | 7/2002 | Bartels |

FOREIGN PATENT DOCUMENTS

WO 03034748 A1 4/2003

OTHER PUBLICATIONS

JP 2001155374 "Record/Reproducing Optical System, and Optical Head Device".
JP 2002074733 "Optical Pickup Device".
5-54414 (A); Mar. 3, 1993 "Optical Pickup Device".
ISR Publication, International Publication No. WO2005/006312A1.

* cited by examiner

*Primary Examiner*—Evelyn A. Lester

(57) ABSTRACT

A beam-shaping element includes a cavity, a first fluid and a second fluid having different indices of refraction. An optical axis extends through the cavity. The cavity has at least one curved surface extending transverse the optical axis. At least one pump is arranged to pump the fluids between a first configuration in which the first fluid occupies the cavity, and a second configuration in which the second fluid occupies the cavity.

12 Claims, 5 Drawing Sheets

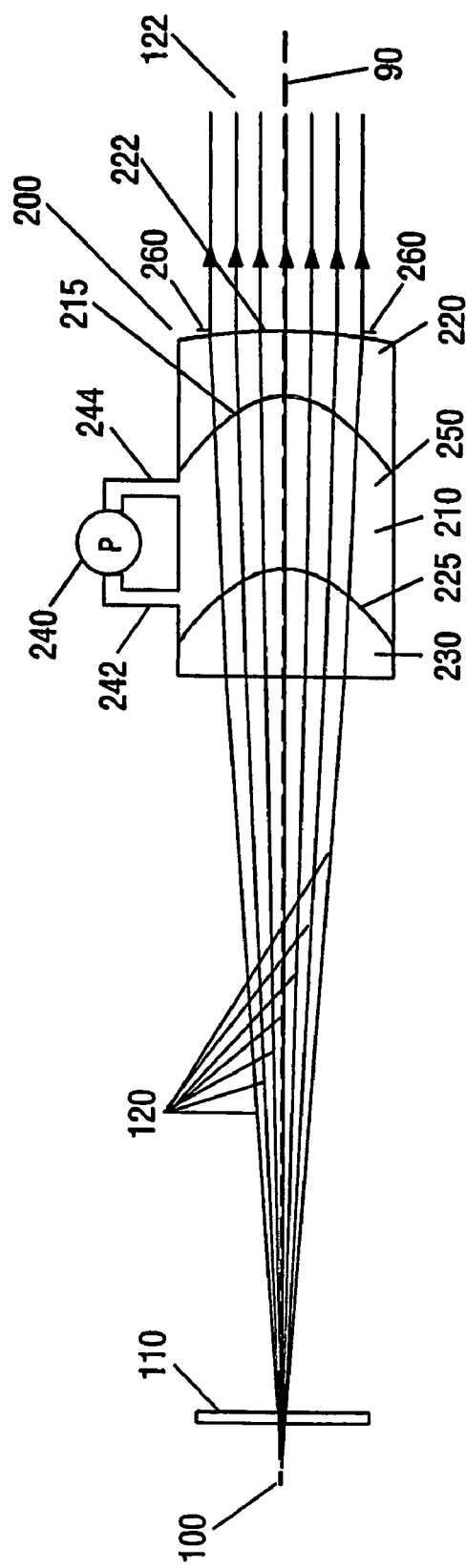
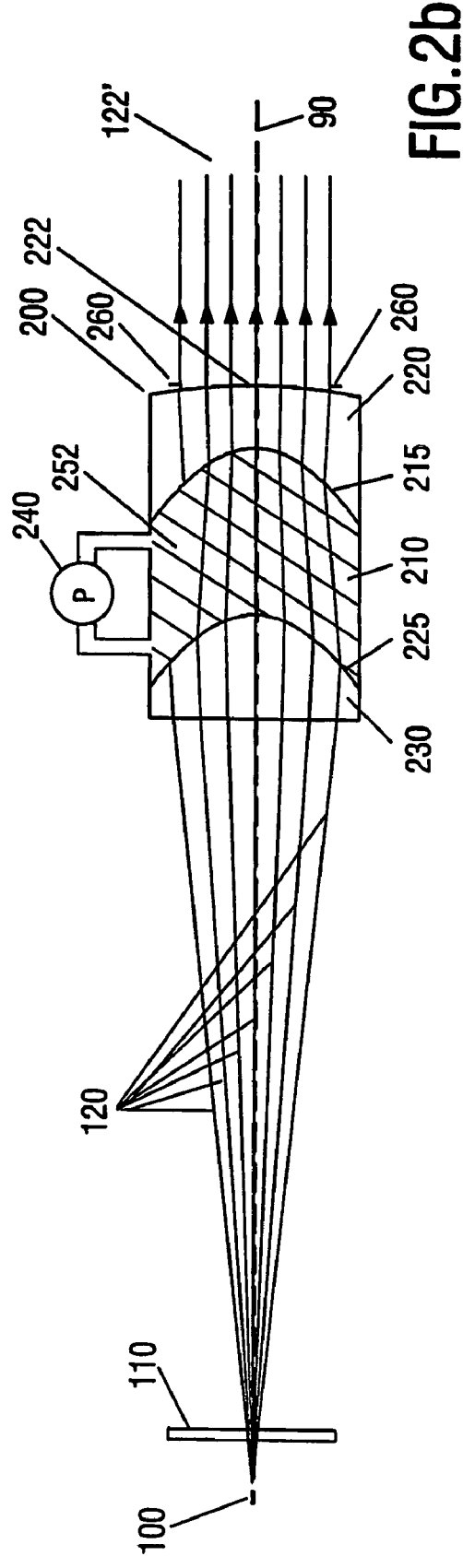

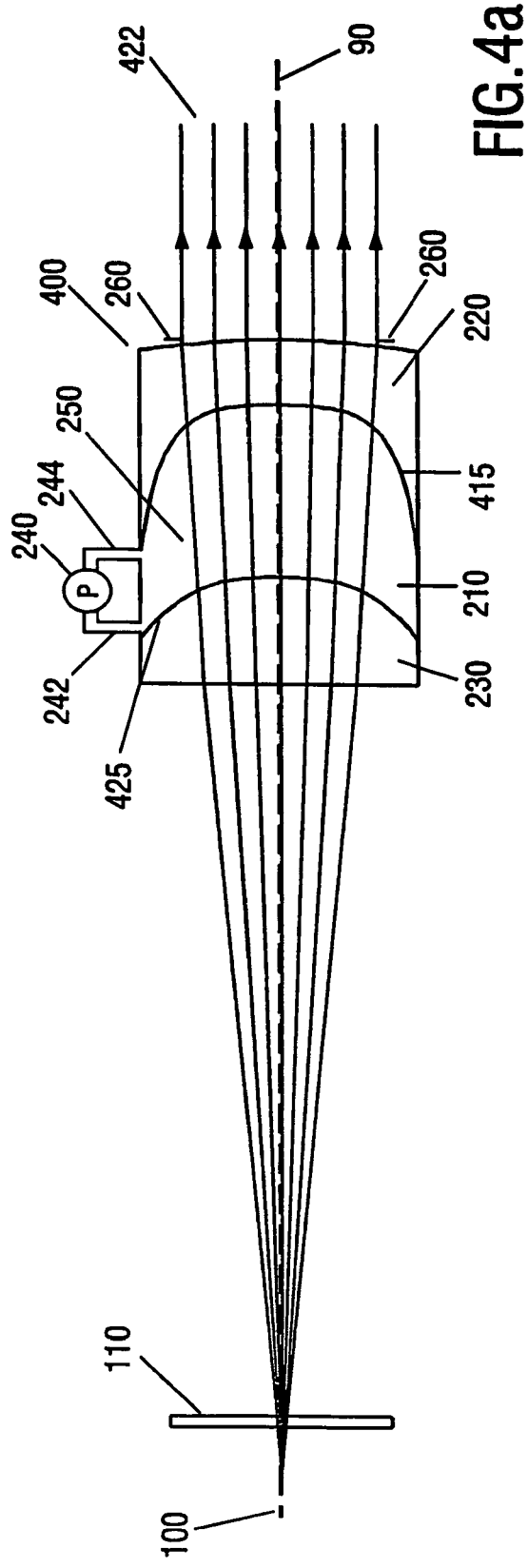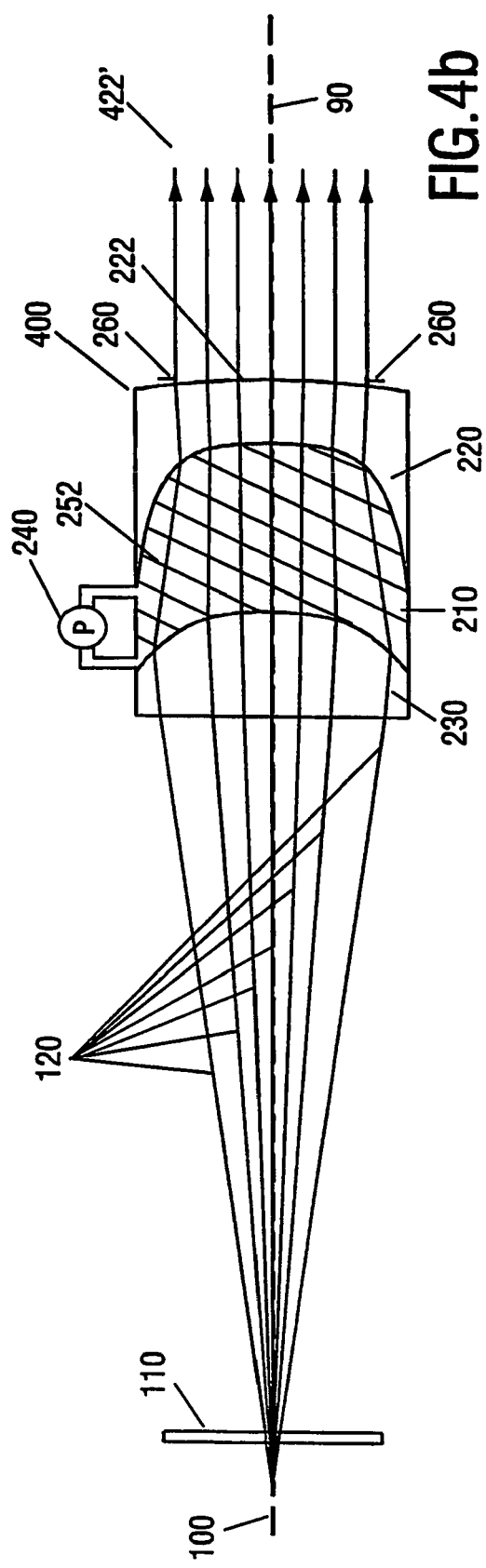

VARIABLE BEAM SHAPING ELEMENT

FIELD OF THE INVENTION

The present invention relates to an optical scanning device for scanning an optical record carrier, to an optical beam-shaping element suitable for, but not limited to, regulating the intensity profile of a radiation beam in such a scanning device, and to methods for manufacturing such a device and such an element.

BACKGROUND OF THE INVENTION

In optical storage, reading and writing place different requirements on the radiation spot used to scan the record carrier. Examples of optical record carriers include CD's (Compact Discs) and DVD's (Digital Versatile Discs).

When reading information from the carrier, the radiation spot size determines the mark size that is readable. It is therefore desirable that the spot size is small, so as to allow the reading of small mark sizes on carriers having a high information density.

When writing information to a carrier, the radiation spot size is less critical. Rather, it is desirable that the optical path from the radiation source to the information carrier is efficient (i.e. low loss). This reduces the power consumption of the radiation source, a factor which is particularly significant for portable applications. Further, radiation sources are typically lasers. The lifetime of a laser increases if the light path between the laser and the record carrier is efficient, as the laser can be operated at lower drive currents to generate the desired radiation intensity incident on the record carrier.

In order to obtain a small spot size for reading, it is desirable that the intensity distribution of the optical beam incident on the objective lens system is relatively flat. In other words, for reading, it is desirable that the radiation beam has a high rim-intensity (rim-intensity is the relative intensity of the beam at the edge of the entrance pupil of the objective system compared to the intensity along the optical axis).

FIG. 1 illustrates the typical optical intensity distribution across the width of a radiation beam of radius r. It will be seen that the highest optical intensity $I_{max}$ is at the centre of the beam (i.e. along the optical axis in a typical scanning device), falling off relatively sharply with distance away from the beam centre. The rim intensity of the beam could be increased for reading applications by placing an absorbing spatial filter in the beam, so as to reduce transmission of central parts of the beam. However, such a filter would decrease the efficiency of the total light path, making the use of such a filter undesirable for writing applications.

It is an aim of embodiments of the present invention to provide an optical beam-shaping element suitable for addressing at least one of the problems of the prior art, whether referred to herein or otherwise.

It is an aim of embodiments of the present invention to provide an optical element suitable for providing a high rim-intensity for reading radiation beams, without unduly decreasing the efficiency of the light path for writing radiation beams.

SUMMARY OF THE INVENTION

In a first aspect, the present invention provides a beam-shaping element comprising: a cavity; an optical axis extending through the cavity; a first fluid and a second fluid having different indices of refraction; and at least one pump arranged to pump the fluids between a first configuration in which the first fluid occupies the cavity, and a second configuration in which the second fluid occupies the cavity; and wherein the cavity has at least one curved surface extending transverse the optical axis.

By providing such a beam-shaping element, the performance (e.g. power of the lens) provided by the beam-shaping element can easily be changed by changing the liquid contained within the cavity. Such an element has a number of possible applications, but is particularly suitable for providing a variable collimator (i.e. a collimator of variable power) for use in an optical scanning device.

In another aspect, the present invention provides an optical device comprising a beam-shaping element, the element comprising:

a cavity;

an optical axis extending through the cavity;

a first fluid and a second fluid having different indices of refraction; and at least one pump arranged to pump the fluids between a first configuration in which the first fluid occupies the cavity, and a second configuration in which the second fluid occupies the cavity; and wherein the cavity has at least one curved surface extending transverse the optical axis.

In a further aspect, the present invention provides a method of manufacturing a beam-shaping element, the method comprising the steps of: providing a cavity, with an optical axis extending through the cavity, the cavity having at least one curved surface extending transverse the optical axis; providing a first fluid and a second fluid having different indices of refraction; and providing at least one pump arranged to pump the fluids between a first configuration in which the first fluid occupies the cavity, and a second configuration in which the second fluid occupies the cavity.

In another aspect, the present invention provides a method of manufacturing an optical device, the method comprising the steps of: providing a beam-shaping element, the beam-shaping element comprising: a cavity; an optical axis extending through the cavity; a first fluid and a second fluid having different indices of refraction; and at least one pump arranged to pump the fluids between a first configuration in which the first fluid occupies the cavity, and a second configuration in which the second fluid occupies the cavity; and wherein the cavity has at least one curved surface extending transverse the optical axis.

In another aspect, the present invention provides a method of operating a beam-shaping element, the element comprising a cavity; an optical axis extending through the cavity; the cavity having at least one curved surface extending transverse the optical axis; a first fluid and a second fluid having different indices of refraction; and at least one pump, the method comprising a first step of pumping the first fluid out of the cavity; and a second step of pumping the second fluid into the cavity. In a preferred embodiment of the method the first step and the second step are performed simultaneously.

BRIEF DESCRIPTION OF THE DRAWINGS

For a better understanding of the invention, and to show how embodiments of the same may be carried into effect, reference will now be made, by way of example, to the accompanying diagrammatic drawings in which:

FIGS. 2A and 2B are schematic diagrams illustrating a beam-shaping element acting as a collimator for a laser beam, in accordance with a first embodiment of the present invention, with the collimator in respectively a read mode and a write mode;

FIGS. 4A and 4B are schematic diagrams illustrating a beam-shaping element acting as a collimator for a laser beam, in accordance with a second embodiment of the present invention, with the collimator in respectively a read mode and a write mode.

DETAILED DESCRIPTION OF PREFERRED EMBODIMENT

Figure 1:
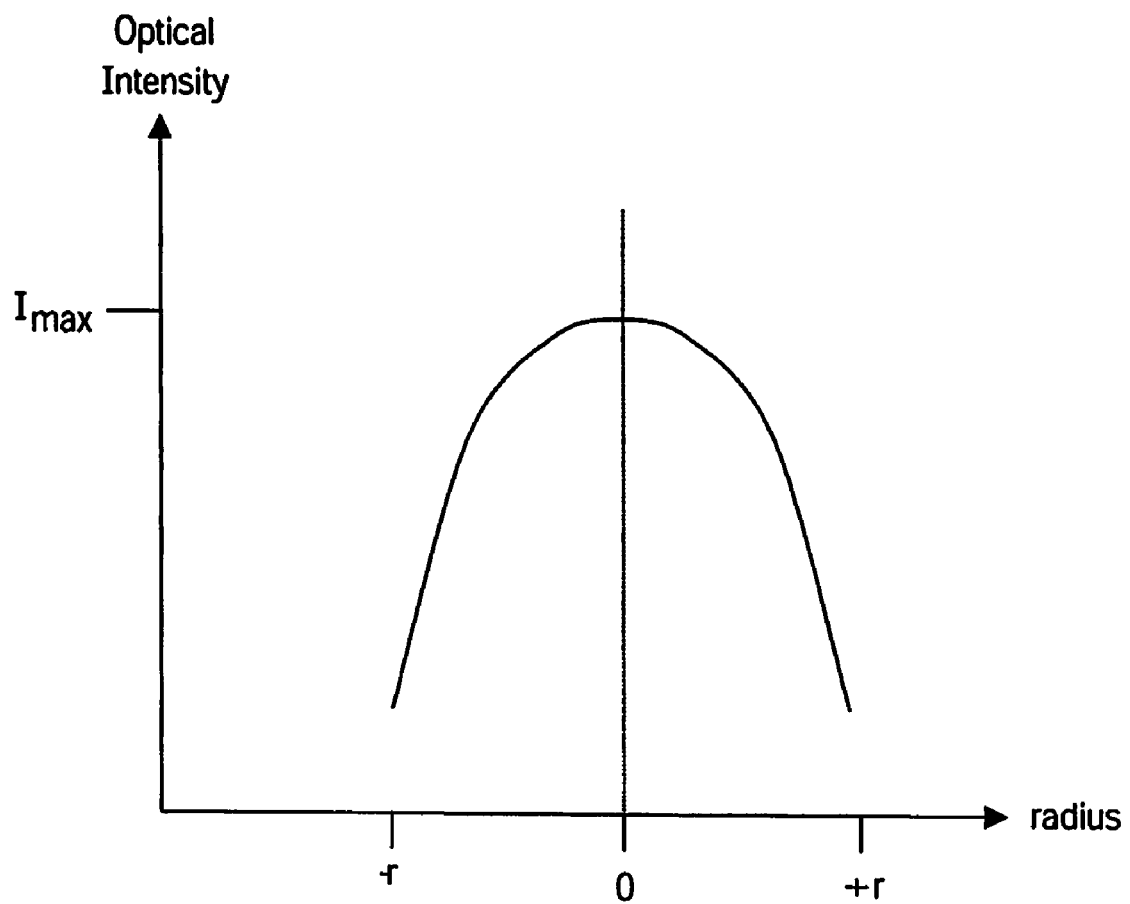
FIG. 1 illustrates the optical intensity profile over a cross-section of a typical radiation beam.

The present inventors have realised that an adjustable beam-shaping element can be provided by providing a cavity, which can in turn be filled with a fluid of a first refractive index, and another fluid with a second, different refractive index.

At least one surface of the cavity has a curved surface. Consequently, the beam-shaping (e.g. the alternation of optical path) provided by the element when filled with the first fluid will be different from that provided by the element when filled with the second fluid. The two fluids have different refractive indices. At least one pump is provided to fill the cavity with the first and second fluids, as desired.

A fluid is a substance that alters its shape in response to any force, that tends to flow or to conform to the outline of its chamber, and that includes gases, vapours, liquids and mixtures of solids and liquids capable of flow.

The two fluids are preferably substantially immiscible i.e. the two fluids do not mix. The two fluids can be of substantially equal density, so as to minimise the effects of gravity upon the element.

A beam-shaping element is an element that alters the profile of incident light. For instance, the element may act as a lens, acting to converge or diverge one or more wavelengths of the incident light. A variable or adjustable beam shaping element is an element in which the optical properties (e.g. lens power) can be altered.

In this specification, the term light is not limited to visible electromagnetic radiation, but applies to all wavelengths of electromagnetic radiation.

Embodiments of the present invention are particularly suitable for use in optical scanning devices.

The light efficiency of an optical pick-up unit (OPU) is determined by the choice of the numerical aperture (NA) of the collimator lens. Further, the collimator NA determines the rim intensity of the laser light beam on the objective lens. The rim intensity, which decreases with the NA, should be high to obtain a small spot on the disc (thus preventing cross-talking between adjacent tracks). On the other hand, to obtain high power efficiency a high collimator NA is preferable. In writing mode, the rim intensity can be lowered due to the non-linear nature of the writing process in the phase change layer of the disc. Consequently, there is a trade-off between efficiency and rim intensity. High power efficiencies allow high bit rates whilst writing, and high rim intensities are needed for good readout of the disc.

FIGS. 2A, 2B, 4A and 4B show collimators 200, 400 in accordance with embodiments of the present invention that allow both a high path efficiency and a high rim intensity.

FIGS. 2A and 2B show two different configurations of the collimator 200. In both figures, a laser diode 100 outputs light 120 through a glass window 110. The collimator 200 is arranged to produce substantially parallel light 122, 122' from the incident light 120. The parallel light 122, 122' is substantially parallel to the optical axis 90, which in this embodiment extends both through collimator 200 and the laser diode 100.

In this embodiment, the collimator 200 effectively comprises three concatenated lens elements 210, 220, 230, forming a compound lens i.e. three lens elements in series. The collimator is effectively comprised of two fixed lens elements interspaced by a variable element. The central lens element 210 is formed by a cavity or chamber, which may be filled by either one of two fluids 250, 252. In this particular embodiment, for design simplicity, the two lenses 220, 230 either side of the cavity are formed of a material having a refractive index close to that of one of the fluids (although it will be appreciated that in alternative embodiments, such lenses may be formed of materials having any refractive index).

For instance, in this particular embodiment, one fluid may be water, and the other fluid may be oil. A plastic, such as PMMA (Polymethylmethacrylate) may be used, which has a refractive index of 1.51 at 405 nm i.e. close to that of oil. The refractive index of water is 1.35 at an optical wavelength of 405 nm.

Both surfaces 215, 225 of the cavity 210 lying along the optical axis 90 are curved (and both are convex, as viewed from the laser diode light source 100). These surfaces also define the surfaces of the adjacent lenses 220, 230. The input surface of the collimator 200 (i.e. the surface of the lens 230 adjacent to the light source 100) is planar, and substantially perpendicular to the optical axis 90. The output surface 222 of the collimator 200 (i.e. the surface of the lens 220 external to the collimator) is curved (and appears convex as viewed from the position of the light source 100). A beam stop 260 on the outer surface of the collimator 200 defines an output aperture of predetermined radius for the output beam 122, 122'.

A pump 240 is connected to the cavity 210 by, in this instance, two channels 242, 244. The connections between the pump and the cavity 250 are schematically indicated in the Figure. In general, the two connections are diametrically opposed with respect to the cavity. The pump is arranged to store at least a volume of fluid corresponding to the size of the cavity 210. This allows the pump to store the fluid that is pumped out of the chamber 210. The pump can achieve this by either having an additional vessel to store the fluid, or alternatively the volume of the pump chamber in conjunction with the length of the two channels 242, 244 may be sufficient to store the desired volume.

The pump 240 is arranged to pump the two fluids such that one or other of the two fluids 250, 252 fills the cavity 210. This can be done by one of the fluids displacing the other fluid within the cavity, where the cohesion and immiscibility of the fluids are important. Alternatively the cavity being emptied by the pump, and subsequently the cavity refilled with the other fluid. When the two fluids are of unequal density, gravity may assist in the emptying and/or filling.

If desired, in order to improve the ability of the cavity 210 to be emptied or filled of respective fluid 250, 252, the interior of the cavity 210 may have a controllably variable wettability. For instance, such a variable wettability could be provided by arranging an electrode covered by an insulating layer on the interior of the cavity 210, such that electrowetting may be used to control the wettability. The change in wettablitity will exert a force on the interface between the two fluids, thereby expelling one fluid from the cavity and/or filling the cavity with the other fluid. For example, in a water-oil system a high wettability will force water in the cavity and a low wettability will force oil in the cavity. In this embodiment the cavity itself is the pump. See also European patent application nr. 02080387.0 for details of this electrowetting pump.

Various types of pump may be used as the pump 240. For instance, international patent application WO 02/069016 describes a number of ways of how fluid can be moved e.g. electro-capillary differential-pressure electro-capillarity, electrowetting, continuous electrowetting, electrophoresis, electroosmosis, dielectrophoresis, electrohydrodynamic pumping, thermocapillary, thermal expansion, dielectric pumping, or variable dielectric pumping, any of which could be used to provide the pump action required by the pump 240. Alternatively, a mechanical pump could also be used.

Changing the fluid 250, 252 with the cavity 210 changes the configuration of the lens between that shown in FIG. 2A and that shown in FIG. 2B, with a corresponding change in the profile of the output beam (from beam 122 to 122').

FIG. 2A shows the collimator 200 in first configuration with the cavity 210 filled with oil 250. This can be viewed as the read mode. As the refractive index of the oil 250 matches that of the plastic of the lenses 220, 230, then the cavity has no optical power and the numerical aperture of the collimator is only determined by the curvature of the output surface 222.

In the configuration shown in FIG. 2B (the write mode), the cavity 210 is filled with water 252. Consequently, as a refractive index difference exists between the water and the material forming the lenses 230, 220, the cavity has optical power. The result is that the numerical aperture of the collimator is determined not only by the output surface 222, but also by the cavity surfaces 215, 225.

Figure 3:
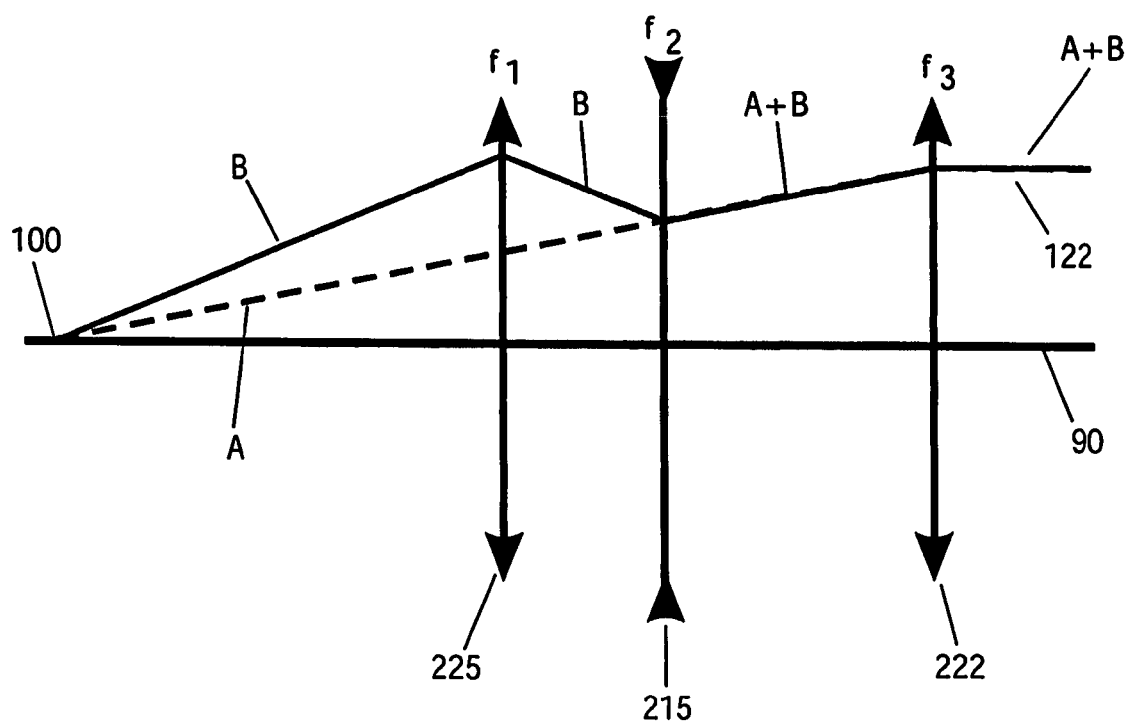
FIG. 3 is a ray diagram indicating the different effective lens functions provided by the different modes of the embodiment shown in FIGS. 2A and 2B.

For ease of convenience, a paraxial representation of the collimator shown in FIGS. 2A and 2B is provided in FIG. 3. The rays labeled A correspond to the configuration shown in FIG. 2A, with the rays labeled B corresponding to the write mode configuration shown in FIG. 2B.

In the paraxial approximation, the output surface 222 of the collimator is effectively a positive lens with a focal length $f_3$. The cavity surfaces 215, 225 introduce an additional positive and negative lens of focal lengths respectively $f_2$ and $f_1$. In the reading mode (the configuration shown in FIG. 2A), the lenses $f_1$ and $f_2$ are effectively invisible, and the numerical aperture is determined by the lens $f_3$, in conjunction with the radius of the stop 260 located at the front surface (the marginal ray is indicated by the letter A in FIG. 3).

In the writing mode (i.e. when the collimator 200 is in the configuration shown in FIG. 2B), the lenses of focal lengths $f_1$ and $f_2$ also act to image the light source. The focal length of the total lens system (formed by lenses $f_1$, $f_2$ and $f_3$) is thus shorter than in the reading mode, and as the radius of the stop 260 is unchanged, consequently the NA is higher. The marginal ray of this configuration is shown by the solid line B.

From the paraxial lens design analysis, it will be appreciated that it is advantageous to place the switching lens element as close as possible to the collimator. Then the optical power and therefore the surface curvature required are relatively small.

FIGS. 4A and 4B illustrate a collimator 400 in accordance with an alternative embodiment of the present invention. The two figures indicate two different configurations of the collimator 400. Identical reference numerals in this Figure indicate similar features to that shown in FIGS. 2A and 2B.

It will be appreciated that the lens design of the collimator 400 is generally similar to that of the collimator 200. However, the curvature of the cavity surfaces 415, 425 of the collimator 400 differs from the curvature of the surfaces 215, 225 of the collimator 200. Consequently, the beam output profiles 422, 422' of the collimator 400 differ from that of the profiles 122, 122' of the collimator 200.

The output profile of a laser diode is approximately Gaussian. If a large portion of the output is collected with a high NA collimator, then the intensity at the rim is low. As a consequence, the effective numerical aperture of an objective lens in a scanning device is reduced, resulting in a larger spot on the disc. Furthermore, the modulation of the high frequency marks used for positioning of the spot can be too low for robust detection. The article by B. R. Frieden, *Lossless Conversion of a Plane Laser Wave to a Plane Wave of Uniform Irradiance*, Applied Optics vol. 14 pp 1400-1403 November 1965, describes how a Gaussian beam profile can be converted to a flat intensity profile by utilising two aspheric surfaces. The two surfaces 415, 425 within the present device represent two such aspheric surfaces.

A major drawback of the device described in the article by B. R. Frieden is that it does not obey the sine law of Abbe. Consequently, the device is very sensitive to manufacturing errors and misalignment.

However, during a writing operation in a scanning device, the wavefront aberration can higher than during reading. For instance, as the beam-shaping element cavity 210 is only active during the writing mode, then this decreases the sensitivity of the collimator 400 to such errors.

In FIG. 4A, the cavity 210 is filled with oil 250. The cavity 210 has no optical power, and the numerical aperture is again only determined by the curvature of the front surface 222. Consequently, the beam profile 422 is Gaussian.

In the write mode shown in FIG. 4B, the cavity 210 is filled with water 252. The cavity has optical power (due to the refractive index difference along the surfaces 415 and 425), and the numerical aperture is determined by the curvature of the surfaces 222, 415 and 425, and the radius of stop 260. The shape of the cavity surfaces 415, 425 extending transverse the optical axis 90, and the difference in refractive indices along these surfaces, are such that the output beam profile 422' is uniform.

It should be understood that the term transverse simply means that the surfaces extend across (i.e. are not parallel to) the optical axis 90.

The skilled person will appreciate that alternative embodiments of the present invention may take a number of forms. For instance, although in the above embodiments, it has been assumed that only two fluids are alternatively used to fill the cavity, it will be appreciated that any number of fluids having different refractive indices can be used to fill the cavity. For instance, three different fluids of different refractive indices could be used, to provide three different distinct configurations of the beam-altering element.

In the above embodiments, it has been assumed that the surfaces 215, 225, 415, 425 of the cavity are rotationally symmetric with respect to the optical axis 90. However, this is not necessarily the case.

In the above embodiment, an example is provided where a Gaussian beam profile can be changed into a flat profile. However, it will be appreciated that other changes in beam profile can be achieved by alternative embodiments of the present invention. For instance, the element may be arranged to change a first Gaussian beam profile to a second Gaussian beam profile, with the second beam profile having a different rim intensity. Preferably, the element is arranged, in the different configurations, to provide two or more different intensity profiles for a given incident radiation beam. Preferably, the two different intensity profiles differ in rim intensity by at least 5% (e.g. one intensity profile has a rim intensity of 95% or less of the other intensity profile).

The beam-shaping element can be combined with one or more other optical elements. Such optical elements may be formed of a material having the same refractive index as one or other of the fluids.

Elements in accordance with embodiments of the present invention can be used in a variety of applications and devices. The elements are particularly suitable for use in altering the intensity profile of a laser beam.

Figure 5:
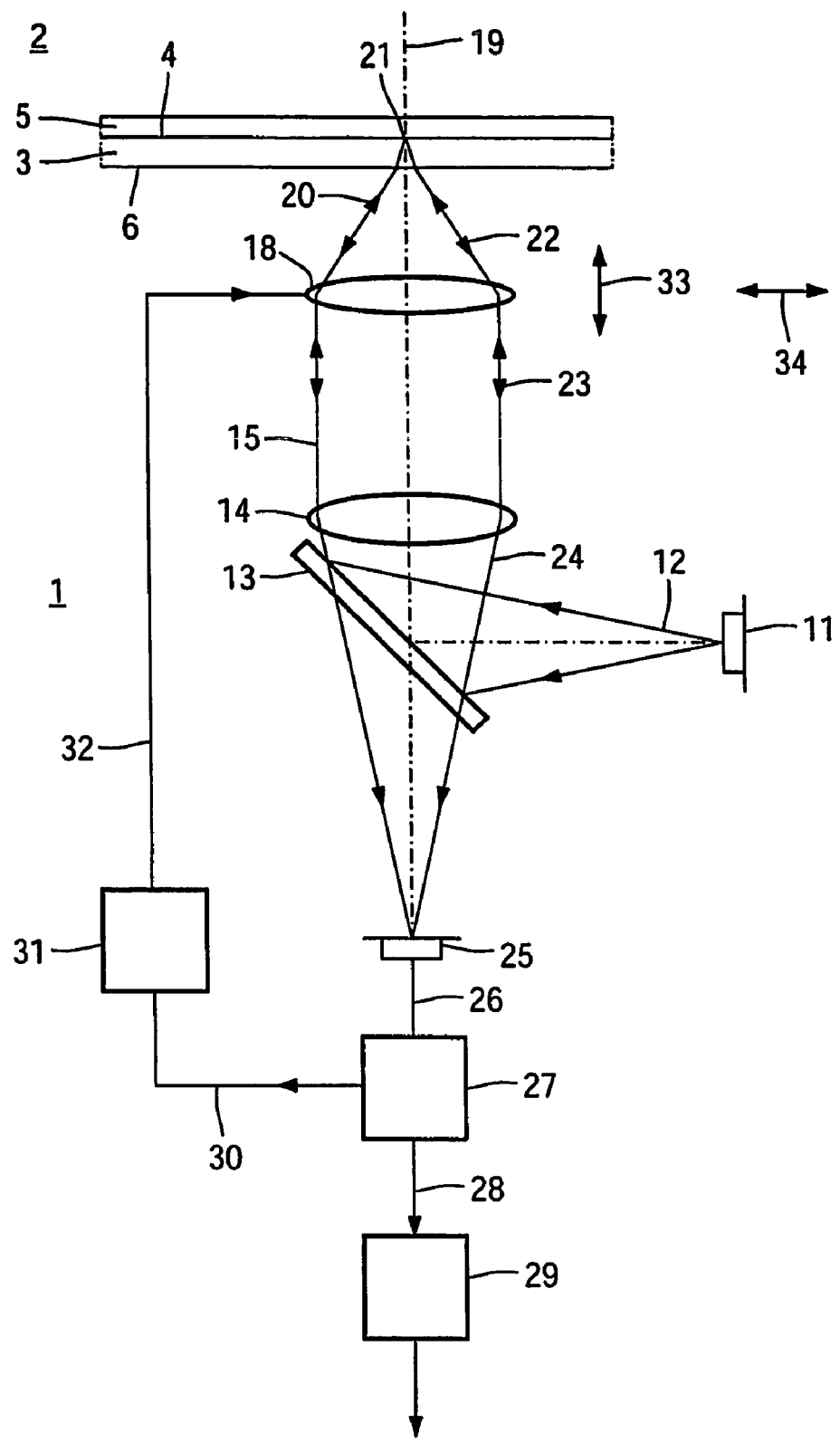
FIG. 5 illustrates a device for scanning an optical record carrier including a collimator in accordance with an embodiment of the present invention.

FIG. 5 shows a device 1 for scanning an optical record carrier 2, including an objective lens system 18 comprising a variable lens in accordance with an embodiment of the present invention. The record carrier comprises a transparent layer 3, on one side of which an information layer 4 is arranged. The side of the information layer facing away from the transparent layer is protected from environmental influences by a protection layer 5. The side of the transparent layer facing the device is called the entrance face 6. The transparent layer 3 acts as a substrate for the record carrier by providing mechanical support for the information layer.

Alternatively, the transparent layer may have the sole function of protecting the information layer, while the mechanical support is provided by a layer on the other side of the information layer, for instance by the protection layer 5 or by a further information layer and a transparent layer connected to the information layer 4.

Information may be stored in the information layer 4 of the record carrier in the form of optically detectable marks arranged in substantially parallel, concentric or spiral tracks, not indicated in the Figure. The marks may be in any optically readable form, e.g. in the form of pits, or areas with a reflection coefficient or a direction of magnetisation different from their surroundings, or a combination of these forms.

The scanning device 1 comprises a radiation source 11 that can emit a radiation beam 12. The radiation source may be a semiconductor laser. A beam splitter 13 reflects the diverging radiation beam 12 towards a collimator lens 14, which converts the diverging beam 12 into a collimated beam 15. The collimated beam 15 is incident on an objective system 18.

The objective system may comprise one or more lenses and/or a grating. The objective system 18 has an optical axis 19. The objective system 18 changes the beam 17 to a converging beam 20, incident on the entrance face 6 of the record carrier 2. The objective system has a spherical aberration correction adapted for passage of the radiation beam through the thickness of the transparent layer 3. The converging beam 20 forms a spot 21 on the information layer 4. Radiation reflected by the information layer 4 forms a diverging beam 22, transformed into a substantially collimated beam 23 by the objective system 18 and subsequently into a converging beam 24 by the collimator lens 14. The beam splitter 13 separates the forward and reflected beams by transmitting at least part of the converging beam 24 towards a detection system 25. The detection system captures the radiation and converts it into electrical output signals 26. A signal processor 27 converts these output signals to various other signals.

One of the signals is an information signal 28, the value of which represents information read from the information layer 4. The information signal is processed by an information processing unit for error correction 29. Other signals from the signal processor 27 are the focus error signal and radial error signal 30. The focus error signal represents the axial difference in height between the spot 21 and the information layer 4. The radial error signal represents the distance in the plane of the information layer 4 between the spot 21 and the centre of a track in the information layer to be followed by the spot. The focus error signal and the radial error signal are fed into a servo circuit 31, which converts these signals to servo control signals 32 for controlling a focus actuator and a radial actuator respectively. The actuators are not shown in the Figure. The focus actuator controls the position of the objective system 18 in the focus direction 33, thereby controlling the actual position of the spot 21 such that it coincides substantially with the plane of the information layer 4. The radial actuator controls the position of the objective lens 18 in a radial direction 34, thereby controlling the radial position of the spot 21 such that it coincides substantially with the central line of track to be followed in the information layer 4. The tracks in the Figure run in a direction perpendicular to the plane of the Figure.

The device of FIG. 5 in this particular embodiment is adapted to scan also a second type of record carrier having a thicker transparent layer than the record carrier 2. The device may use the radiation beam 12 or a radiation beam having a different wavelength for scanning the record carrier of the second type. The NA of this radiation beam may be adapted to the type of record carrier. The spherical aberration compensation of the objective system must be adapted accordingly.

A beam-deflecting element, as described above, may be used as the collimator lens 14 (or as an extra lens inserted between the collimator lens 14 and the object system 18) to provide a beam 15 with the desired profile.

A beam-shaping element in accordance with an embodiment of the present invention can thus be easily utilised to change the intensity profile of an incident radiation beam, with little loss in optical power. Such an element is particularly suitable for use in a collimator in an optical scanning device, as well as any device in which it is desirable to alter the intensity of a radiation beam.

The invention claimed is:

1. A beam-shaping element comprising:
   a cavity;
   an optical axis extending through the cavity;
   a first fluid and a second fluid having different indices of refraction; and
   at least one pump arranged to pump the fluids between a first configuration in which the first fluid occupies the cavity, and a second configuration in which the second fluid occupies the cavity; and
   a fixed lens concatenated with said element, the fixed lens being formed of a material having a refractive index substantially same as a refractive index of one of said fluids;
   wherein the cavity has at least one curved surface extending transverse the optical axis.

2. The element as claimed in claim 1, wherein the pump operates utilizing at least one of: electro-capillary, differential-pressure electro-capillarity, electrowetting, continuous electrowetting, electrophoresis, electroosmosis, dielectrophoresis, electrohydrodynamic pumping, thermocapillary, thermal expansion, dielectric pumping, mechanic pumping or variable dielectric pumping.

3. The element as claimed in claim 1, wherein said cavity is cylindrical, with the longitudinal axis of the cavity being coaxial with the optical axis.

4. The element as claimed in claim 1, wherein said curved surface is aspherical.

5. The element as claimed in claim 1, wherein said curved surface is rotationally symmetric with respect to the optical axis.

6. The element as claimed in claim 1, wherein in the first configuration, the element is arranged to shape an incident radiation beam to provide a first beam intensity profile, and in the second configuration the element is arranged to shape an incident radiation beam to provide a second different beam intensity profile.

7. An optical device comprising a beam-shaping element, the element comprising:
   a cavity;
   an optical axis extending through the cavity;
   a first fluid and a second fluid having different indices of refraction;
   at least one pump arranged to pump the fluids between a first configuration in which the first fluid occupies the cavity, and a second configuration in which the second fluid occupies the cavity; and
   a fixed lens concatenated with said element, the fixed lens being formed of a material having a refractive index substantially same as a refractive index of one of said fluids;
   wherein the cavity has at least one curved surface extending transverse the optical axis.

8. An optical device comprising a beam-shaping element, the element comprising:
   a cavity;
   an optical axis extending through the cavity (210);
   a first fluid and a second fluid having different indices of refraction; and
   at least one pump arranged to pump the fluids between a first configuration in which the first fluid occupies the cavity, and a second configuration in which the second fluid occupies the cavity;
   wherein the cavity has at least one curved surface extending transverse the optical axis; and
   wherein the device is an optical scanning device for scanning an information layer of an optical record carrier, the device comprising a radiation source for generating a radiation beam and an objective system for converging the radiation beam on the information layer.

9. A method of manufacturing a beam-shaping element, the method comprising the acts of:
   providing a cavity, with an optical axis extending through the cavity, the cavity having at least one curved surface extending transverse the optical axis;
   providing a first fluid and a second fluid having different indices of refraction; and providing at least one pump arranged to pump the fluids between a first configuration in which the first fluid occupies the cavity, and a second configuration in which the second fluid occupies the cavity; and
   providing a fixed lens concatenated with said element, the fixed lens being formed of a material having a refractive index substantially same as a refractive index of one of the first and second fluids.

10. A method of manufacturing an optical device, the method comprising the acts of:
   providing a beam-shaping element, the beam-shaping element comprising:
      a cavity;
      an optical axis extending through the cavity;
      a first fluid and a second fluid having different indices of refraction;
      a fixed lens concatenated with said element, the fixed lens being formed of a material having a refractive index substantially same as a refractive index of one of the first and second fluids; and
      at least one pump arranged to pump the fluids between a first configuration in which the first fluid occupies the cavity, and a second configuration in which the second fluid occupies the cavity; and
   wherein the cavity at least one curved surface; extending transverse the optical axis.

11. A method of operating a beam-shaping element, the element comprising a cavity; an optical axis extending through the cavity; the cavity having at least one curved surface extending transverse the optical axis; a first fluid and a second fluid having different indices of refraction; a fixed lens concatenated with said element, the fixed lens being formed of a material having a refractive index substantially same as a refractive index of one of the first and second fluids; and at least one pump, the method comprising:
   a first act of pumping the first fluid out of the cavity; and
   a second act of pumping the second fluid into the cavity, wherein the first act and the second act change an optical characteristic of the element.

12. The method as claimed in claim 11, in which the first act and the second act are performed simultaneously.

\* \* \* \* \*